United States Patent [19]

Shikama et al.

[11] Patent Number: 5,718,953
[45] Date of Patent: Feb. 17, 1998

[54] HEAT-SHRINKABLE TUBING, PROCESS FOR PRODUCTION THEREOF, AND USE THEREOF

[75] Inventors: Kozo Shikama; Seiki Mukai, both of Kure, Japan

[73] Assignee: Teiyo Limited, Hiroshima-Ken, Japan

[21] Appl. No.: 726,205

[22] Filed: Oct. 4, 1996

[30] Foreign Application Priority Data

Oct. 5, 1995 [JP] Japan ................................. 7-259865

[51] Int. Cl.⁶ ..................... B29C 55/22; B65D 65/02; B32B 31/26
[52] U.S. Cl. ................ 428/34.4; 428/35.1; 428/35.5; 428/36.9; 428/332; 428/910; 428/913; 264/209.5; 264/211.12; 156/84
[58] Field of Search .......................... 428/35.7, 35.2, 428/35.5, 36.9, 36.91, 332, 910, 913, 419, 34.9, 35.1, 34.4; 264/209.5, 209.7, 211.12; 156/84, 85, 86

[56] References Cited

U.S. PATENT DOCUMENTS

| | | | |
|---|---|---|---|
| 4,286,018 | 8/1981 | Asakura et al. | 428/332 |
| 4,370,469 | 1/1983 | Deguchi et al. | 428/419 |
| 5,151,235 | 9/1992 | Reed | 264/209.5 |
| 5,346,762 | 9/1994 | Kida et al. | 428/419 |

*Primary Examiner*—Rena Dye
*Attorney, Agent, or Firm*—Wenderoth, Lind & Ponack

[57] ABSTRACT

A heat-shrinkable tubing formed substantially from a polyphenylene sulfide, which can be produced by stretching an unstretched tubing formed substantially from a polyphenylene sulfide 1.05 to 4.5 times in the longitudinal direction and 1.3 to 4.5 times in the direction perpendicular to the longitudinal direction at 85° to 105° C.; and a surface-covered inorganic material product which is obtained by covering an inorganic material product with the above tubing and then subjecting the tubing to heat shrinkage.

9 Claims, No Drawings

HEAT-SHRINKABLE TUBING, PROCESS FOR PRODUCTION THEREOF, AND USE THEREOF

BACKGROUND OF THE INVENTION

1. Field of the Invention

The present invention relates to a heat-shrinkable tubing formed substantially from a polyphenylene sulfide, a process for production thereof, and use thereof. More particularly, the present invention relates to a heat-shrinkable tubing formed substantially from a polyphenylene sulfide, which is heat-shrinkable, which has greatly superior heat resistance, flame resistance and chemical resistance after heat treatment under a restricted shrinkage, and which is usable as a general-purpose electrical insulating material, a covering material for heating element, etc.; a process for production of the heat-shrinkable tubing; and use of the tubing.

2. Description of Related Art

As the general-purpose electrical insulating material of heat-shrinkable tubing type, used in a condenser, etc., a polyvinyl chloride tubing and a polyethylene terephthalate (PET) tubing are known.

The limits of heat resistances of these insulating materials, however, are up to 105° C. and 120° C., respectively.

Meanwhile, with the recent change of flon to a substitute flon for environmental protection, a general-purpose heat-shrinkable tubing having a heat resistance of 130° C. or higher has been desired for use in refrigerators or the like.

Further, there have been so far found no general-purpose heat-resistant material of tubing type which meets Class F specified in JIS C4003 or can be used continuously at 155° C. or higher, and therefore, development of such a heat-shrinkable tubing material has been strongly demanded from the industry.

DETAILED DESCRIPTION OF THE INVENTION

The first object of the present invention is to provide a heat-shrinkable tubing formed substantially from a polyphenylene sulfide.

The second object of the present invention is to provide a heat-shrinkable tubing formed substantially from a polyphenylene sulfide, which can be used as a covering or protective material by utilizing the heat resistance, flame resistance, electrical properties and chemical resistance possessed by the polyphenylene sulfide.

The third object of the present invention is to provide a process for producing a heat-shrinkable tubing formed substantially from a polyphenylene sulfide industrially advantageously.

Another object of the present invention is to provide a surface-coated or surface-protected inorganic material product obtained by covering or protecting an inorganic material product with the above heat-shrinkable tubing formed substantially from a polyphenylene sulfide and then subjecting the tubing to heat shrinkage.

According to the present invention, there is provided a heat-shrinkable tubing formed substantially from a polyphenylene sulfide.

The present invention further provides a process for producing a heat-shrinkable tubing formed substantially from a polyphenylene sulfide, which comprises stretching an unstretched tubing formed substantially from a polyphenylene sulfide 1.05 to 4.5 times in the longitudinal direction and 1.3 to 4.5 times in the direction (radial direction) perpendicular to the longitudinal direction at 85° to 105° C.

The present invention furthermore provides a surface-coated inorganic material product obtained by covering an inorganic material product with a heat-shrinkable tubing formed substantially from a polyphenylene sulfide and then subjecting the tubing to heat shrinkage.

The present invention is hereinafter described in more detail.

The heat-shrinkable tubing formed substantially from a polyphenylene sulfide (hereinafter referred to simply as "heat-shrinkable PPS tubing" sometimes), provided by the present invention, shrinks when subjected to a heat treatment such as a treatment in air or hot water kept at 100° C., whereby its length in the longitudinal direction and/or in the direction perpendicular to the longitudinal direction or its circumference reduces.

In the heat-shrinkable PPS tubing of the invention, the heat shrinkage (%) in the direction (hereinafter referred to simply as "radial direction") perpendicular to the longitudinal direction is 20 to 100%, preferably 25 to 80%.

Further, in the heat-shrinkable PPS tubing of the invention, the total shrinkage in the longitudinal direction and the radial direction is 30 to 150%, preferably 35 to 100%, particularly preferably 40 to 100%. Herein, the heat shrinkage refers to, as described later, a proportion (%) of the length after heat shrinkage to the original length before heat shrinkage at the time when the tubing has been kept in hot water of 100° C. for 30 seconds.

In the heat-shrinkable PPS tubing of the invention, the total heat shrinkage in the longitudinal direction and the radial direction is desired to be in the above range. In actual application of the tubing, however, it is appropriate that the heat shrinkage in the radial direction is larger than that in the longitudinal direction.

For example, the appropriate heat shrinkage in the radial direction is at least 1.5 times, preferably 2 to 5 times that in the longitudinal direction. Specifically, it is appropriate that the heat shrinkage in the longitudinal direction is 2 to 30%, preferably 5 to 20%, while the heat shrinkage in the radial direction is 20 to 100%, preferably 25 to 80%, more preferably 30 to 70%.

The shape of the heat-shrinkable PPS tubing has no particular restriction, but the tubing is produced so as to fit the size of a product to be covered or protected with the tubing. In general, the thickness (film thickness) of the tubing is desired to be 10 to 300 μm, preferably 15 to 250 μm, particularly preferably 20 to 200 μm, but its optimum range varies depending upon the application of the tubing. The circumference (outer periphery) of the tubing in the radial direction is generally determined depending upon the application, but is desired to be usually in the range of 3 to 400 mm, preferably 4 to 300 mm.

The polyphenylene sulfide constituting the tubing may be any polyphenylene sulfide ordinarily used as a resin for forming a film substrate or other chemical product. Preferred one is polyphenylene sulfide containing paraphenylene sulfide units

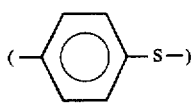

in an amount of 80 mole % or more, preferably 90 mole % or more, of the total repeating units.

The polyphenylene sulfide may contain other copolymerized units in an amount of 20 mole % or less, preferably 10 mole % or less, of the total repeating units so long as it can form the tubing having heat resistance and electrical properties as intended by the present invention.

Further, by such copolymerization, the polyphenylene sulfide can be improved in moldability or other properties. Examples of the other copolymerizable units are as follows.

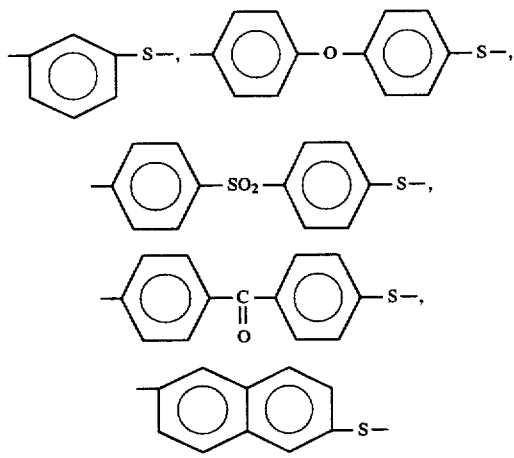

The polyphenylene sulfide used in the present invention preferably has a substantially straight-chain polymer structure, but its repeating units may be cross-linked in an amount of 10 mole % or less, preferably 5 mole % or less, particularly preferably 1 mole % or less so long as the heat-shrinkability and the properties of the resulting covering material are not impaired. By having the partially crosslinked structure, the polyphenylene sulfide may be controlled in viscosity.

The tubing of the present invention is constituted by the polyphenylene sulfide, as described above, but may further contain other heat resistant polymers of 30% by weight or less, preferably 20% by weight or less, particularly preferably 10% by weight or less, of the total polymers, for improving the properties and processability. Examples of the other polymer includes a polysulfone, polyolefin, polyphenylene ether, polyether imide, polyether ketone, polyester, fluororesin, polyacrylate or the like. Use of these polymers is often effective for improvement of the tear strength of the tubing.

The tubing of the present invention may further contain, as required, additives such as a stabilizer, coloring agent, antioxidant, ultraviolet absorber, antifoaming agent or the like. Further, the tubing may contain fine particles of an organic or inorganic lubricant or the like to improve slipperiness of the tubing. Suitable as the fine particles for providing the slipperiness are known inert external particles of kaolin, clay, calcium carbonate, silicon oxide, calcium terephthalate, aluminum oxide, titanium oxide, calcium phosphate, lithium fluoride or the like; and organic compounds having a high melting point and crosslinked polymers which are insoluble in melt-extrusion of polyphenylene sulfide.

The fine particles contained in the tubing have an average particle diameter of 0.01 to 10 μm, preferably 0.1 to 10 μm, particularly preferably 4 to 10 μm. Herein, the average particle diameter refers to a particle diameter of fine particles, of which the cumulative weight distribution, measured by a laser diffraction method using, for example, SADL-1100 manufactured by Shimadzu Corporation, is 50%. The fine particles, however, generally contain large-diameter particles having particle diameters in the range of 4 to 30 μm, preferably 4 to 25 μm. When a polymer contained in the tubing contains only particles smaller than 4 μm, there can be obtained no remarkable effect in the openability of tubing, etc. When a polymer contained in the tubing contains particles larger than 30 μm, such particles generate defects in a tubing of small thickness in particular and may invite reduction in strength. The content of the large-diameter particles is preferably 2 to 80% by weight, more preferably 10 to 70% by weight, most preferably 20 to 60% by weight, of the total particles.

The effect of fine particles is particularly remarkable in a tubing of low stretch ratio, in which projections of fine particles are difficult to form when stretched. Further, such a tubing has good printability because the tubing has small projections of fine particles at the outer surface which comes into contact with the stretching pipe since the unstretched tubing is expanded by the application of an internal pressure to make its diameter restricted in an stretching pipe. On the other hand, in the inner surface of the tubing which makes no contact with the stretching pipe, projections of fine particles is easy to generate so that openability of tubing can be improved.

The content of fine particles is 0.05 to 4 parts by weight, preferably 0.02 to 2.5 parts by weight, per 100 parts by weight of PPS resin.

The polyphenylene sulfide is melted under heating at a temperature equal to or higher than the melting point by a melt-extrusion apparatus and continuously extruded from a ring die, and the extrudate is forcibly cooled to obtain an unstretched tubing. As the means for forced cooling, there can be used an immersion into low-temperature water, a cooling by cold air, etc.

The above-obtained unstretched tubing is pressurized from inside using a compressed gas and is stretched biaxially. While the method for stretching is not particularly restricted, stretching is conducted, for example, by feeding an unstretched tubing at a given speed while applying a pressure of a compressed gas to the inside of the tubing from one end of the tubing, then preheating the unstretched tubing by hot water, an infrared heater or the like, and sending the unstretched tubing into a stretching pipe heated to an intended stretching temperature for controlling a stretch ratio in the radial direction, to conduct biaxial stretching. The stretching conditions such as temperature or the like are determined so that the unstretched tubing can undergo stretching at an appropriate position of the stretching pipe. After stretching, the tubing is cooled and taken off and wound up as a stretched tubing while being passed through a pair of nip rolls and being kept at a given stretching pressure. The order of stretching in the longitudinal direction and stretching in the radial direction may be arbitrary, but simultaneous stretching in the longitudinal and radial directions is preferred.

The stretch ratio in the longitudinal direction is determined by the ratio of the feed rate of unstretched tubing to the speed of nip rolls after stretching, while the stretch ratio in the radial direction is determined by the ratio of the outer diameter of unstretched tubing to the outer diameter of stretched tubing.

An alternative method for stretching, there can be employed a method which comprises nipping each of the unstretched tubing (a feeding side) and the stretched tubing (a takeing-off side) by a pair of nip rolls and maintaining the pressure of the compressed gas sealed up within the tubing at a given level.

The conditions for stretching vary depending upon the properties of polymer used and the heat-shrinkability of intended tubing. Generally, however, the stretching temperature is 85° to 105° C., preferably a temperature not lower than the glass transition temperature of polymer used but not higher than 100° C.; the stretch ratio is 1.05 to 4.5, preferably 1.05 to 3.0 in the longitudinal direction of tubing and 1.3 to 4.5, preferably 1.3 to 3.5, in the radial direction of tubing; and the area stretch ratio is 1.5 to 15.

The stretched tubing obtained by stretching under the above conditions, generally, has a shrinkage of 20% or more in the radial direction when tested, for example, by immersion in hot water of 100° C. for 30 seconds. The stretched tubing can be effectively used for the purposes of such as insulating covering (for example, a condenser is placed inside the tubing and the tubing is heat-shrunken), insulation (for example, an electric wire is inserted into the tubing and then the tubing is hot-shrunken) or wrapping.

Further, by heat-setting the stretched tubing at a temperature not lower than 200° C. and not higher than the melting point of the tubing under tension or restricted shrinkage, the stretched tubing can have extremely superior heat resistance. In some case, according to application purpose, a tubing heat-set under tension may be used.

The present invention further provides a variety of surface-covered inorganic material products obtained by covering the surface of an inorganic material product with the above-mentioned heat-shrinkable tubing. The inorganic material product to be surface-covered may be any inorganic material product for which the properties such as insulating property and heat resistance of polyphenylene sulfide can be utilized, and includes, for example, metal products and glass products. Specific examples of the metal products are a condenser, electric wire (round wire and polygonal wire), steel pipe and electric appliances. Electric appliances include a motor coil end, a transformer and a lead wire, and a small-sized motor can be covered with the tubing on the whole surface. Specific examples of glass products are electric bulbs and fluorescent lamps, and in particular, it can be used as a covering for a fluorescent lamp of facsimile and image scanner.

Effect of the Invention

The heat-shrinkable tubing formed substantially from a polyphenylene sulfide, according to the present invention, has heat resistance meeting Class F (continuously usable at a temperature of 155° C. or higher), excellent flame retardancy (VW-1 in UL standard 224), chemical resistance and electrical properties, is easily heat-shrinkable at a temperature at least equal to the glass transition temperature of polyphenylene sulfide used and therefore, is a novel tubing which is very useful as a heat-resistant covering material.

Accordingly, the heat-shrinkable tubing of the present invention is very suitable for covering and insulation of a condenser (conventional general-purpose heat-shrinkable tubings have been insufficient in heat resistance); covering of a flat type wire, a crossover wire or the like; protective wrapping for a terminal; taping in folded form; and insulating covering of a heating element.

Further, surprisingly, the present heat-shrinkable tubing causes no deformation or the like owing to the high heat resistance even when, after covering and heat shrinkage, exposed to reheating (for example, at 160° C. for 3 minutes) in soldering or the like; thus, the present heat-shrinkable tubing is highly useful.

The present invention is hereinafter explained in more detail by way of Examples.

In the Examples, the properties were measured by the following methods.

(1) Heat Shrinkage (%)

A tubing was immersed in hot water of 100° C. for 30 seconds. The lengths and diameters of the tubing before and after the immersion were measured to calculate the heat shrinkage (%) of the tubing.

(2) Heat Resistance at High-Temperature

A heat-set tubing or a heat-shrinkable tubing was treated at 200° C. for 100 hours (before the treatment, the latter tubing had been heat-shrunken at 180° C. for 20 seconds in a state that an iron-made cylinder having an outside diameter 2 mm smaller than the inside diameter of the tubing had been inserted into the tubing), and deformation and change in appearance of the tubing were checked. "Change in appearance" was evaluated by visually observing occurrence of surface cracking, wrinkles and peeling.

(3) Deformation after Reheating

In order to evaluate the heat resistance of a heat-shrinkable tubing in soldering or the like, the heat-shrinkable tubing was heat-shrunken at 180° C. for 20 seconds in a state that a condenser having a diameter 2 mm smaller than the inside diameter of the tubing and a length 5 mm smaller than the length of the tubing was inserted into the tubing and thereafter, the tubing was reheated at 160° C. for 3 minutes to examine its appearance change such as bulging.

(4) Flame Resistance

Measured by UL 224 Optional VW-1 Flame Test used for evaluating the flame retardancy of a tubing.

(5) Tear Strength

Measured by Elmendorf tear test (according to JIS K 71288).

EXAMPLE 1

To 100 parts by weight of a polyphenylene sulfide (PF350A manufactured by Kureha Chemical Industry Co., Ltd.) was added 0.2 part by weight of a kaolin having an average particle diameter of 4.8 μm, which contained 57.8% by weight of particles of a diameter as large as 4 to 25 μm, based on 100 parts by weight of the total particles. The mixture was dried and then melted at 310° C. The melt was extruded through a ring die. The extrudate was immersed in water, cooled and solidified to obtain an unstretched tubing.

The unstretched tubing had an outer diameter and thickness as shown in Table 1. To the unstretched tubing was applied an internal pressure by the use of a hot water of 100° C., a stretching pipe having an inside diameter of 16 mm and an air having a pressure of 2.0 kg/cm², to stretch the unstretched tubing under the conditions shown in Table 1 and then, the stretched tubing was cooled with water to obtain a stretched heat-shrinkable tubing having a thickness of 50μ. The shape and properties of this heat-shrinkable tubing are shown in Table 1.

EXAMPLES 2–3

Stretched tubings were produced in the same manner as in Example 1 except that the conditions shown in Table 1 were used. The properties of the stretched tubings are shown in Table 1. They are superior in heat resistance and show no deformation after reheating and have excellent processability and machinability.

EXAMPLE 4

A stretched tubing was obtained in the same manner as in Example 1 except that the conditions shown in Table 1 were used. The stretched tubing was heat-set at 250° C. for 60 seconds under the same tension as used in the stretching (an internal pressure of 2.0 kg/cm² was used and the length in the longitudinal direction after stretching was maintained). The obtained tubing had a low heat shrinkage (%) and was stable.

EXAMPLES 5-6

Stretched tubings were produced in the same manner as in Example 1 except that there was used, as a polyphenylene sulfide, PX0010 (a product of Dainippon Ink and Chemicals, Inc.) or LD-10P (a product of Toyobo Co., Ltd.). The properties of the stretched tubings are shown in Table 1.

As shown in Table 1, the stretched tubings showed excellent properties, as compared with general-purpose polyethylene terephthalate tubings which show complete deformation in high-temperature heat resistance and bulging in deformation after reheating and has processability problems in soldering.

EXAMPLE 7

A stretched tubing was produced in the same manner as in Example 3 except that there was used a mixture prepared by chip-blending 80% by weight of a polyphenylene sulfide resin (R3200 produced by Kureha Chemical Industry Co., Ltd.) and 20% by weight of a polysulfone resin (P1700 produced by Teijin Amoco Engineering Plastics Limited). In the stretched tubing, improvement was recognized in tear strength in the radial direction.

What is claimed is:

1. A heat-shrinkable tubing which is substantially formed from a polyphenylene sulfide and has a heat shrinkage of 25 to 80% in a direction perpendicular to a longitudinal direction of the tubing.

2. The tubing according to claim 1, which has a heat shrinkage of 30 to 70% in the direction perpendicular to the longitudinal direction.

3. The tubing according to claim 1, wherein the polyphenylene sulfide contains repeating units represented by

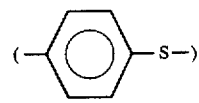

in an amount of 80 mole % or more, of the total repeating units.

4. The tubing according to claim 1, which has a thickness of 10 to 300 μm.

5. The tubing according to claim 1, which has a circumferential length of 3 to 400 mm in the direction perpendicular to the longitudinal direction.

6. A surface-covered inorganic material product, obtained by covering an inorganic material product with a heat-shrinkable tubing of claim 1 and then subjecting the tubing to heat shrinkage.

7. A method of covering a surface of an inorganic material product, which comprises covering an inorganic material product with a heat-shrinkable tubing of claim 1 and then subjecting the tubing to heat shrinkage.

TABLE 1

| | | Example 1 | Example 2 | Example 3 | Example 4 | Example 5 | Example 6 | Example 7 |
|---|---|---|---|---|---|---|---|---|
| Unstretched tubing | Outer diameter (m/m) | 8.0 | 7.5 | 7.5 | 8.0 | 7.6 | 7.6 | 7.5 |
| | Thickness (μ) | 250 | 150 | 240 | 500 | 180 | 180 | 240 |
| Stretching conditions | Temperature (°C.) | 100 | 96 | 96 | 100 | 98 | 98 | 98 |
| | Stretch ratio in longitudinal direction | 2.5 | 1.5 | 1.2 | 3.3 | 1.1 | 1.1 | 1.2 |
| | Stretch ratio in radial direction | 2.0 | 2.0 | 2.0 | 3.0 | 2.0 | 2.0 | 2.0 |
| | Thickness of stretched tubing (μ) | 50 | 50 | 100 | 50 | 80 | 80 | 100 |
| Heat shrinkage (%) | Longitudinal direction | 56 | 34 | 11 | 66 | 9 | 11 | 7 |
| | Radial direction | 38 | 43 | 44 | 48 | 37 | 42 | 41 |
| Heat-fixing conditions | | none | none | none | 250° C. 60 sec. | none | none | none |
| Shrinkage after heat setting (%) | Longitudinal direction | — | — | — | 2.0 | — | — | — |
| | Radial direction | — | — | — | 1.0 | — | — | — |
| Heat resistance | Heat resistance at high-temperature | No change | No change | No change | No change | No change | No change | No change |
| | Deformation after reheating | No | No | No | No | No | No | No |
| Flame resistance (UL224) | | VW-1 | VW-1 | VW-1 | VW-1 | VW-1 | VW-1 | VW-1 |
| Polymer used | | PF350A (Kureha) | PF350A (Kureha) | PF350A (Kureha) | PF350A (Kureha) | PX0010 (DIC) | LD-10P (Toyobo) | R3200(Kureha)/ P1700(Teijin Amoco) = 80/20 |
| Tensile yield strength (kg/cm²) | | | | 750 | 1250 | | | |
| Breaking strength (kg/cm²) | | | | 930 | 1385 | | | |
| Elongation at break (%) | | | | 100 | 14 | | | |
| Tear strength (gf) | Longitudinal direction | | | 119 | | | | 104 |
| | Radial direction | | | 71 | | | | 106 |

8. A process for producing a heat-shrinkable tubing formed substantially from a polyphenylene sulfide, which comprises stretching an unstretched tubing formed substantially from a polyphenylene sulfide 1.05 to 4.5 times in the longitudinal direction and 1.3 to 4.5 times in the direction perpendicular to the longitudinal direction at 85°0 to 105° C., wherein the heat-shrinkable tubing has a heat shrinkage of 25 to 80% in a direction perpendicular to the longitudinal direction of the tubing.

9. The process according to claim 8, wherein the polyphenylene sulfide contains repeating units represented by

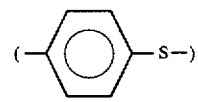

in an amount of 80 mole % or more of the total repeating units.